(12) United States Patent
Stockett et al.

(10) Patent No.: US 10,589,463 B2
(45) Date of Patent: Mar. 17, 2020

(54) PRINT HEAD FOR ADDITIVE MANUFACTURING SYSTEM

(71) Applicant: CC3D LLC, Coeur d'Alene, ID (US)

(72) Inventors: Ryan C. Stockett, Lebanon, NH (US); Kenneth Lyle Tyler, Coeur d'Alene, ID (US)

(73) Assignee: Continuous Composites Inc., Coeur d'Alene, ID (US)

(*) Notice: Subject to any disclaimer, the term of this patent is extended or adjusted under 35 U.S.C. 154(b) by 109 days.

(21) Appl. No.: 15/961,084

(22) Filed: Apr. 24, 2018

(65) Prior Publication Data

US 2019/0001562 A1 Jan. 3, 2019

Related U.S. Application Data (60) Provisional application No. 62/526,448, filed on Jun. 29, 2017.

(51) Int. Cl.
*B29C 64/209* (2017.01)
*B29C 64/165* (2017.01)
(Continued)

(52) U.S. Cl.
CPC .......... *B29C 64/209* (2017.08); *B29C 64/124* (2017.08); *B29C 64/165* (2017.08); *B29C 64/255* (2017.08); *B29C 64/291* (2017.08); *B29C 64/295* (2017.08); *B29C 64/393* (2017.08); *B29C 64/40* (2017.08);
(Continued)

(58) Field of Classification Search
CPC ............................ B29C 64/209; B29C 64/393
See application file for complete search history.

(56) References Cited

U.S. PATENT DOCUMENTS 3,286,305 A 11/1966 Seckel
3,765,325 A * 10/1973 Warren ................. B44B 5/0047
101/6
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Michael H. Wilson
*Assistant Examiner* — Jennifer A Kessie
(74) *Attorney, Agent, or Firm* — Ryan C. Stockett (57) ABSTRACT

A print head is disclosed for use with an additive manufacturing system. The print head may include a nozzle, and a traveling anchor point mounted at a trailing side of the nozzle. The traveling anchor point may include an arm extending radially outward from the nozzle, and a plunger slidingly disposed in the arm. The traveling anchor point may also include an actuator configured to selectively move the plunger from a stowed position to an engaged position against material discharging from the nozzle.

20 Claims, 2 Drawing Sheets

(51) Int. Cl.

| | | |
|---|---|---|
| *B29C 70/06* | (2006.01) | |
| *B29C 70/52* | (2006.01) | |
| *B29C 70/50* | (2006.01) | |
| *B29C 70/24* | (2006.01) | |
| *B29C 64/295* | (2017.01) | |
| *B29C 64/291* | (2017.01) | |
| *B29C 64/393* | (2017.01) | |
| *B29C 64/124* | (2017.01) | |
| *B29C 64/255* | (2017.01) | |
| *B29C 64/40* | (2017.01) | |
| *B29C 35/08* | (2006.01) | |
| *B29C 70/38* | (2006.01) | |
| *B33Y 30/00* | (2015.01) | |
| *B33Y 10/00* | (2015.01) | |
| *B33Y 70/00* | (2020.01) | |
| *B33Y 50/02* | (2015.01) | |
| *B29K 105/00* | (2006.01) | |
| *B29K 105/08* | (2006.01) | |
| *B29C 35/02* | (2006.01) | |
| *F16L 9/128* | (2006.01) | |
| *B29C 48/15* | (2019.01) | |
| *B22F 3/105* | (2006.01) | |
| *B29C 64/245* | (2017.01) | |
| *B22F 3/00* | (2006.01) | |
| *B29C 64/112* | (2017.01) | |
| *B29K 101/10* | (2006.01) | |

(52) U.S. Cl.
CPC .............. *B29C 70/06* (2013.01); *B29C 70/24* (2013.01); *B29C 70/384* (2013.01); *B29C 70/50* (2013.01); *B29C 70/523* (2013.01); *B33Y 10/00* (2014.12); *B33Y 30/00* (2014.12); *B33Y 50/02* (2014.12); *B33Y 70/00* (2014.12); *B22F 3/008* (2013.01); *B22F 3/1055* (2013.01); *B22F 2003/1056* (2013.01); *B29C 35/0261* (2013.01); *B29C 35/0805* (2013.01); *B29C 48/15* (2019.02); *B29C 64/112* (2017.08); *B29C 64/245* (2017.08); *B29C 2035/0827* (2013.01); *B29C 2035/0833* (2013.01); *B29C 2035/0838* (2013.01); *B29C 2035/0855* (2013.01); *B29C 2035/0877* (2013.01); *B29K 2101/10* (2013.01); *B29K 2105/08* (2013.01); *B29K 2105/251* (2013.01); *F16L 9/128* (2013.01)

(56) References Cited

U.S. PATENT DOCUMENTS

| | | | |
|---|---|---|---|
| 3,809,514 | A | 5/1974 | Nunez |
| 3,984,271 | A | 10/1976 | Gilbu |
| 3,993,726 | A | 11/1976 | Moyer |
| 4,643,940 | A | 2/1987 | Shaw et al. |
| 4,671,761 | A | 6/1987 | Adrian et al. |
| 4,822,548 | A | 4/1989 | Hempel |
| 4,851,065 | A | 7/1989 | Curtz |
| 5,002,712 | A | 3/1991 | Goldmann et al. |
| 5,037,691 | A | 8/1991 | Medney et al. |
| 5,296,335 | A | 3/1994 | Thomas et al. |
| 5,340,433 | A | 8/1994 | Crump |
| 5,746,967 | A | 5/1998 | Hoy et al. |
| 5,866,058 | A | 2/1999 | Batchelder et al. |
| 5,936,861 | A | 8/1999 | Jang et al. |
| 6,153,034 | A | 11/2000 | Lipsker |
| 6,305,769 | B1 | 10/2001 | Thayer et al. |
| 6,459,069 | B1 | 10/2002 | Rabinovich |
| 6,501,554 | B1 | 12/2002 | Hackney et al. |
| 6,799,081 | B1 | 9/2004 | Hale et al. |
| 6,803,003 | B2 | 10/2004 | Rigali et al. |
| 6,934,600 | B2 | 8/2005 | Jang et al. |
| 7,039,485 | B2 | 5/2006 | Engelbart et al. |
| 7,555,404 | B2 | 6/2009 | Brennan et al. |
| 7,795,349 | B2 | 9/2010 | Bredt et al. |
| 8,221,669 | B2 | 7/2012 | Batchelder et al. |
| 8,962,717 | B2 | 2/2015 | Roth et al. |
| 9,126,365 | B1 | 9/2015 | Mark et al. |
| 9,126,367 | B1 | 9/2015 | Mark et al. |
| 9,149,988 | B2 | 10/2015 | Mark et al. |
| 9,156,205 | B2 | 10/2015 | Mark et al. |
| 9,186,846 | B1 | 11/2015 | Mark et al. |
| 9,186,848 | B2 | 11/2015 | Mark et al. |
| 9,327,452 | B2 | 5/2016 | Mark et al. |
| 9,327,453 | B2 | 5/2016 | Mark et al. |
| 9,370,896 | B2 | 6/2016 | Mark |
| 9,381,702 | B2 | 7/2016 | Hollander |
| 9,457,521 | B2 | 10/2016 | Johnston et al. |
| 9,458,955 | B2 | 10/2016 | Hammer et al. |
| 9,527,248 | B2 | 12/2016 | Hollander |
| 9,539,762 | B2 | 1/2017 | Durand et al. |
| 9,579,851 | B2 | 2/2017 | Mark et al. |
| 9,688,028 | B2 | 6/2017 | Mark et al. |
| 9,694,544 | B2 | 7/2017 | Mark et al. |
| 9,764,378 | B2 | 9/2017 | Peters et al. |
| 9,770,876 | B2 | 9/2017 | Farmer et al. |
| 9,782,926 | B2 | 10/2017 | Witzel et al. |
| 10,160,193 | B2 * | 12/2018 | Nielsen-Cole ......... B33Y 30/00 |
| 2002/0009935 | A1 | 1/2002 | Hsiao et al. |
| 2002/0062909 | A1 | 5/2002 | Jang et al. |
| 2002/0113331 | A1 | 8/2002 | Zhang et al. |
| 2002/0165304 | A1 | 11/2002 | Mulligan et al. |
| 2003/0044539 | A1 | 3/2003 | Oswald |
| 2003/0056870 | A1 | 3/2003 | Comb et al. |
| 2003/0160970 | A1 | 8/2003 | Basu et al. |
| 2003/0186042 | A1 | 10/2003 | Dunlap et al. |
| 2003/0236588 | A1 | 12/2003 | Jang et al. |
| 2005/0006803 | A1 | 1/2005 | Owens |
| 2005/0061422 | A1 | 3/2005 | Martin |
| 2005/0104241 | A1 | 5/2005 | Kritchman et al. |
| 2005/0104257 | A1 | 5/2005 | Gu et al. |
| 2005/0109451 | A1 | 5/2005 | Hauber et al. |
| 2005/0230029 | A1 | 10/2005 | Vaidyanathan et al. |
| 2007/0003650 | A1 | 1/2007 | Schroeder |
| 2007/0228592 | A1 | 10/2007 | Dunn et al. |
| 2008/0176092 | A1 | 7/2008 | Owens |
| 2009/0095410 | A1 | 4/2009 | Oldani |
| 2011/0032301 | A1 | 2/2011 | Fienup et al. |
| 2011/0143108 | A1 | 6/2011 | Fruth et al. |
| 2012/0060468 | A1 | 3/2012 | Dushku et al. |
| 2012/0159785 | A1 | 6/2012 | Pyles et al. |
| 2012/0231225 | A1 | 9/2012 | Mikulak et al. |
| 2012/0247655 | A1 | 10/2012 | Erb et al. |
| 2013/0164498 | A1 | 6/2013 | Langone et al. |
| 2013/0209600 | A1 | 8/2013 | Tow |
| 2013/0233471 | A1 | 9/2013 | Kappesser et al. |
| 2013/0292039 | A1 | 11/2013 | Peters et al. |
| 2013/0337256 | A1 | 12/2013 | Farmer et al. |
| 2013/0337265 | A1 | 12/2013 | Farmer |
| 2014/0034214 | A1 | 2/2014 | Boyer et al. |
| 2014/0061974 | A1 | 3/2014 | Tyler |
| 2014/0159284 | A1 | 6/2014 | Leavitt |
| 2014/0232035 | A1 | 8/2014 | Bheda |
| 2014/0268604 | A1 | 9/2014 | Wicker et al. |
| 2014/0291886 | A1 | 10/2014 | Mark et al. |
| 2015/0048553 | A1 | 2/2015 | Dietrich et al. |
| 2015/0136455 | A1 | 5/2015 | Fleming |
| 2015/0273762 | A1 | 10/2015 | Okamoto |
| 2016/0012935 | A1 | 1/2016 | Rothfuss |
| 2016/0031155 | A1 | 2/2016 | Tyler |
| 2016/0046082 | A1 | 2/2016 | Fuerstenberg |
| 2016/0052208 | A1 | 2/2016 | Debora et al. |
| 2016/0082641 | A1 | 3/2016 | Bogucki et al. |
| 2016/0082659 | A1 | 3/2016 | Hickman et al. |
| 2016/0107379 | A1 | 4/2016 | Mark et al. |
| 2016/0114532 | A1 | 4/2016 | Schirtzinger et al. |
| 2016/0136885 | A1 | 5/2016 | Nielsen-Cole et al. |
| 2016/0144565 | A1 | 5/2016 | Mark et al. |
| 2016/0144566 | A1 | 5/2016 | Mark et al. |
| 2016/0192741 | A1 | 7/2016 | Mark |

(56) References Cited

U.S. PATENT DOCUMENTS

| | | |
|---|---|---|
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1* | 1/2017 | Lewicki ............... B29C 64/118 |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1* | 2/2017 | Evans ................... B29C 69/001 |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0136688 A1 | 5/2017 | Knecht et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173692 A1 | 6/2017 | Myerberg et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

(56) References Cited

OTHER PUBLICATIONS

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).
International Search Report dated Aug. 10, 2018 for PCT/US18/33326 to CC3D LLC Filed May 18, 2018.

\* cited by examiner

PRINT HEAD FOR ADDITIVE MANUFACTURING SYSTEM

RELATED APPLICATIONS

This application is based on and claims the benefit of priority from U.S. Provisional Application No. 62/526,448 that was filed on Jun. 29, 2017, the contents of which are expressly incorporated herein by reference.

TECHNICAL FIELD

The present disclosure relates generally to a print head and, more particularly, to a print head for use in an additive manufacturing system.

BACKGROUND

Continuous fiber 3D printing (a.k.a., CF3D™) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D™ provides for increased strength, compared to manufacturing processes that do not utilize continuous fiber reinforcement, the continuous fibers may require additional care during starting and stopping of printing sequences. The disclosed print head is uniquely configured to provide this additional care and/or to address other issues of the prior art.

SUMMARY

In one aspect, the present disclosure is directed to a print head for an additive manufacturing system. The print head may include a nozzle, and a traveling anchor point mounted at a trailing side of the nozzle. The traveling anchor point may include an arm extending radially outward from the nozzle, and a plunger slidingly disposed in the arm. The traveling anchor point may also include an actuator configured to selectively move the plunger from a stowed position to an engaged position against material discharging from the nozzle.

In another aspect, the present disclosure is directed to another print head for an additive manufacturing system. This print head may include a nozzle, and a traveling anchor point mounted at a trailing side of the nozzle. The traveling anchor point may include an arm extending radially outward from the nozzle, a bushing mounted to move along a length of the arm, and a plunger mounted to slide through the bushing. The traveling anchor point may also include an actuator configured to selectively move the plunger from a stowed position to an engaged position against material discharging from the nozzle. The print head may further include a cure enhancer mounted to the arm between the nozzle and the plunger.

In yet another aspect, the present disclosure is directed to an additive manufacturing system. The additive manufacturing system may include a moveable support, and a print head connected to the moveable support and configured to discharge a continuous reinforcement that is wetted with a liquid matrix. The print head may include a matrix reservoir, a nozzle fluidly connected to the matrix reservoir, and an arm extending radially outward from the nozzle. The print head may also include a bushing mounted to move along a length of the arm, a plunger mounted to slide through the bushing, and an actuator configured to selectively move the plunger from a stowed position to an engaged position against material discharging from the nozzle. The print head may additionally include a UV light mounted to the arm between the nozzle and the plunger. The additive manufacturing system may also include a controller configured to regulate operation of the moveable support, the actuator, and the cure enhancer.

DETAILED DESCRIPTION

Figure 1:
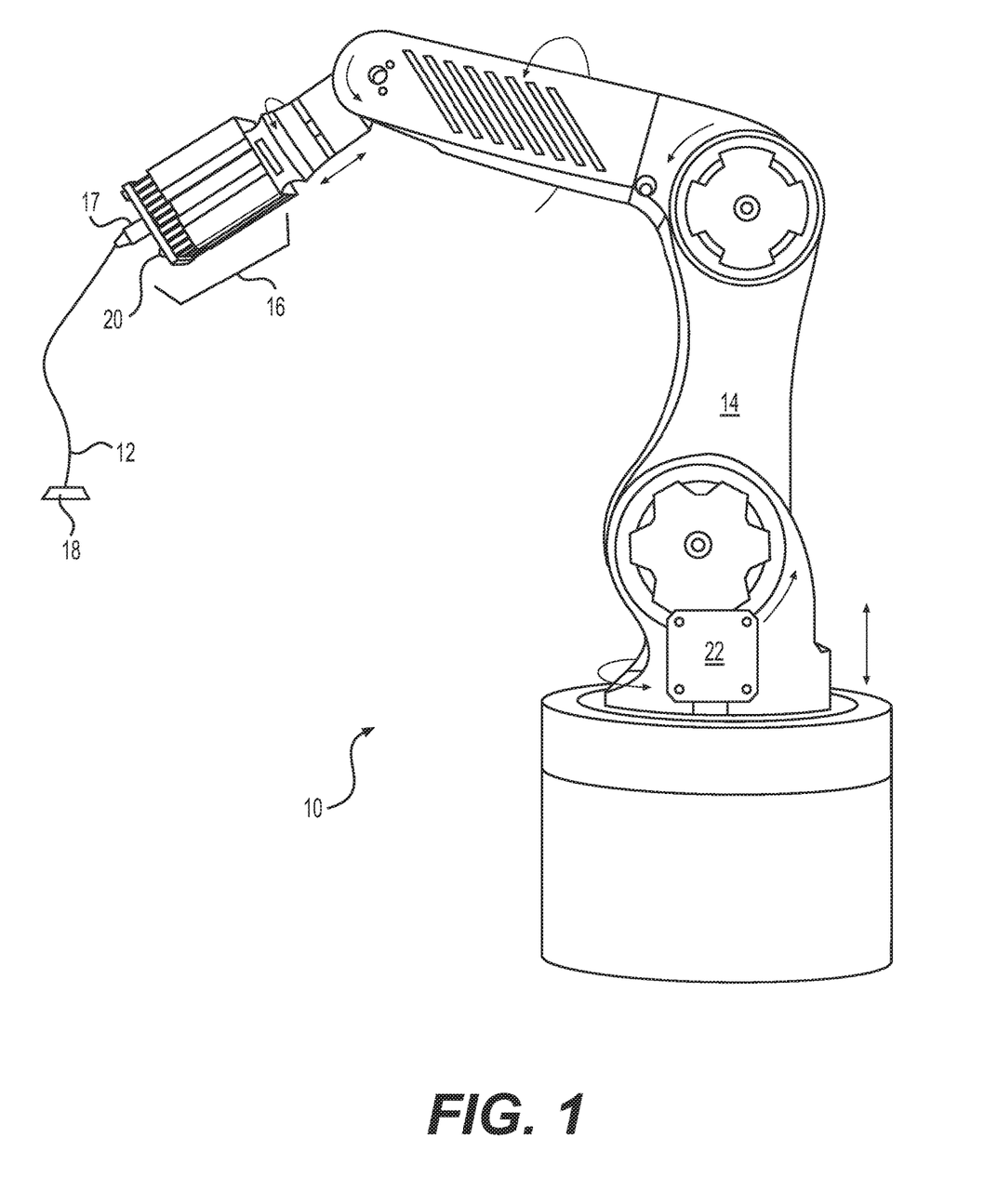
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, ellipsoidal, polygonal, etc.). System 10 may include at least a support 14 and a print head ("head") 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for the same reason. In either situation, head 16 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from a nozzle 17 of head 16 via at least two different modes of operation. In a first mode of operation, the matrix and reinforcement are extruded (e.g., pushed under pressure and/or mechanical force) from nozzle 17, as head 16 is moved by support 14 to create the 3-dimensional shape of structure 12. In a second mode of operation, at least the reinforcement is pulled from nozzle 17, such that a tensile stress is created in the reinforcement during discharge. In this mode of operation, the matrix may cling to the reinforcement and thereby also be pulled from nozzle 17 along with the reinforcement, and/or the matrix may be discharged from nozzle 17 under pressure along with the pulled reinforcement. In the second mode of operation, where the matrix is being pulled from nozzle 17, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from nozzle 17 as a result of head 16 moving away from an anchor point 18. In particular, at the start of structure-formation, a length of matrix-impregnated reinforcement may be pulled and/or pushed from nozzle 17, deposited onto a stationary anchor point 18, and cured, such that the discharged material adheres to anchor point 18. Thereafter, head 16 may be moved away from anchor point 18, and the relative movement may cause additional reinforcement to be pulled from nozzle 17. It should be noted that the movement of the reinforcement through head 16 could be assisted (e.g., via internal feed mechanisms), if desired. However, the discharge rate of the reinforcement from nozzle 17 may primarily be the result of relative movement between head 16 and anchor point 18, such that tension is created within the reinforcement.

Figure 2:
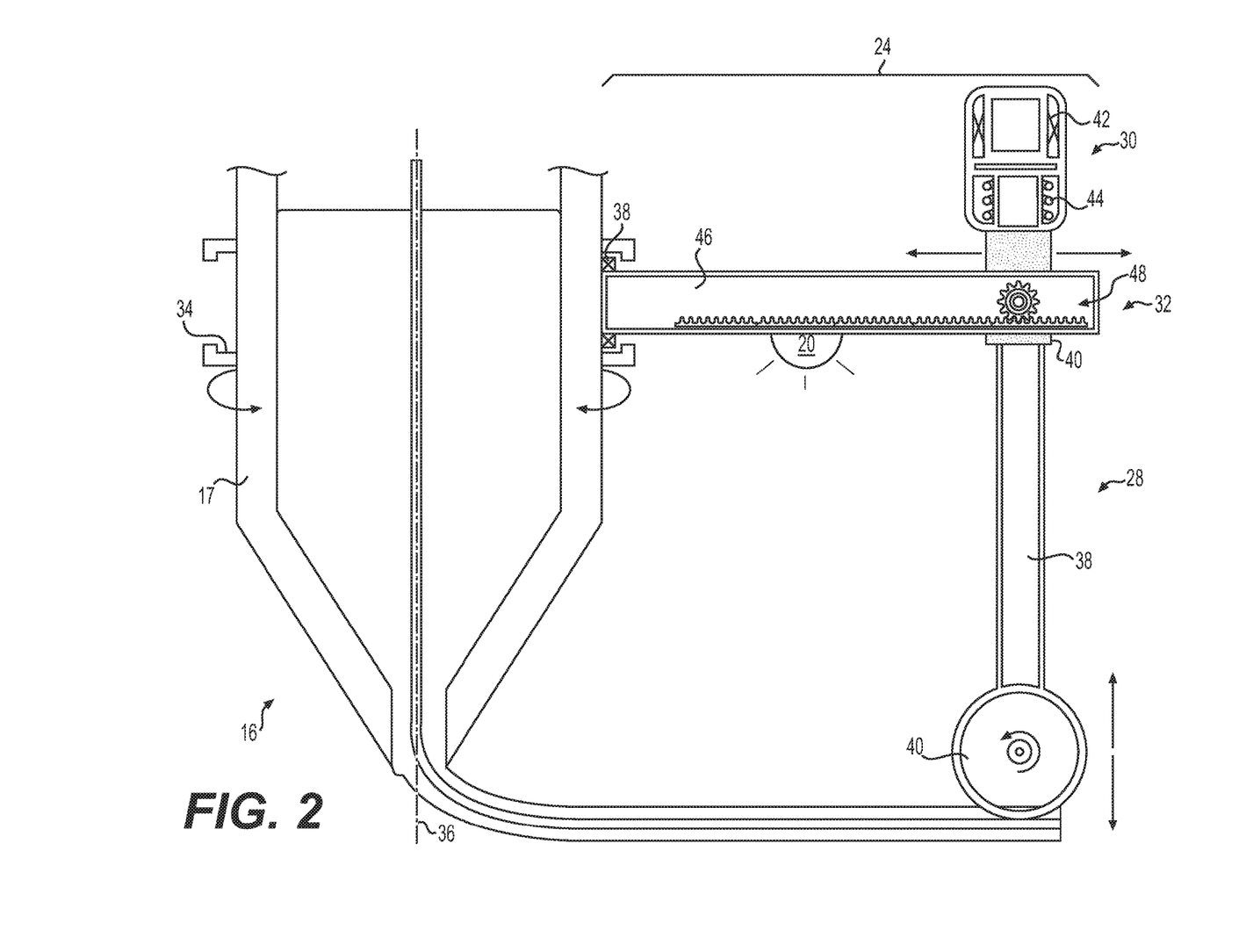
FIG. 2 is a diagrammatic illustration of an exemplary disclosed print head that may be utilized with the manufacturing system of FIG. 1.

Nozzle 17 may be fluidly connected to a matrix reservoir 26. Although matrix reservoir 26 is shown as being at least partially inside of head 16, it should be noted that matrix reservoir 26 could alternatively be located separately upstream of head 16. As shown in FIG. 2, nozzle 17 may be a generally cylindrical component having an upstream or base end in fluid communication with matrix reservoir 26, a downstream or tip end, and one or more axially oriented passages that extend from the base end to the tip end.

Any number of reinforcements (represented as R in FIG. 2) may be passed axially through reservoir 26 where at least some matrix-wetting occurs (matrix represented as M in FIG. 2), and discharged from head 16 via nozzle 17. One or more orifices 27 may be located at the tip end of nozzle 17 to accommodate passage of the matrix-wetted reinforcements. In the disclosed embodiment, a single generally circular orifice 27 is shown. It is contemplated, however, that multiple circular orifices could be used. In addition, orifices 27 of another shape (e.g., a rectangular shape) may allow for printing of ribbons and/or sheets. In the embodiment of FIG. 2, the single orifice 27 is substantially aligned (e.g., aligned within engineering tolerances) with a central axis of nozzle 17.

Returning to FIG. 1, one or more cure enhancers (e.g., one or more light sources, electron beam generators, ultrasonic emitters, lasers, heaters, catalyst dispensers, microwave generators, etc.) 20 may be mounted proximate head 16 (e.g., at a trailing side of nozzle 17) and configured to enhance a cure rate and/or quality of the matrix as it is discharged from nozzle 17. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix, sinter the material, harden the material, or otherwise cause the material to cure as it discharges from nozzle 17.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

In some applications, during fabrication of structure 12, it may be necessary to stop and restart material discharge at an intermediate location that is not conveniently proximate a stationary anchor point 18 (referring to FIG. 1). This may occur, for example, when transitioning between different types and/or sizes of reinforcements and/or matrixes at particular locations within structure 12. This may also occur at locations of fiber orientation changes, or where contours of structure 12 shift abruptly. In any of these situations (and in others), a traveling or temporary anchor point 24 (shown only in FIG. 2) may be beneficial.

As shown in the example of FIG. 2, traveling anchor point ("TAP") 24 may be operatively mounted to head 16 (e.g., at a trailing side of nozzle 17), and used to selectively hold down a loose or free end of a new continuous reinforcement while the associated matrix (i.e., the matrix coating the loose end) has time to cure and bond to an existing surface of structure 12. That is, a specified period of time may be required for the matrix to cure to and bond strong enough to resist the tension generated within the continuous reinforcement during movement of head 16 away from the anchor location. If too little time is allowed for this curing before the tension is generated, the continuous reinforcement may pull free during movement of head 16. And any stationary time of head 16 spent waiting for the desired level of curing may reduce a productivity and efficiency of head 16. TAP 24 may solve this issue, by allowing head 16 to immediately start moving away from the anchor location while TAP 24 holds down the loose end.

TAP 24 may include, among other things, a plunger 28, at least one actuator 30, and an arm 32 that operatively connects plunger 28 and actuator 30 to head 16. In a first embodiment, arm 32 is rigidly connected to head 16, such that an angular orientation of TAP 24 is fixed. In this embodiment, care should be taken to ensure that head 16 is properly oriented relative to a desired restart direction during activation of TAP 24, such that TAP 24 is located at the trailing side of nozzle 17. In a second embodiment, the angular orientation of TAP 24 is adjustable. For example, a base end of arm 32 may be moveable within an annular channel 34 of head 16 (e.g., a channel that surrounds nozzle 17). With this configuration, TAP 24 may be pivoted about an axis 36 of nozzle 17 (e.g., via energizing of a rotary actuator 37) to any desired angle.

Plunger 28 may be moveable between a normal or stowed position (not shown) and any number of extended or engaged positions (shown in FIG. 2). When plunger 28 is in the stowed position, contact between plunger 28 and the material discharging from nozzle 17 may be inhibited. In contrast, when plunger 28 is one of the engaged positions, plunger 28 may exert a pressure on the loose end of the reinforcement trailing from nozzle 17, thereby inhibiting movement of the loose end. Multiple positions may be available, in some applications, such that a variable level of pressure may be exerted. In the disclosed embodiment, the movement between the stowed and engaged position(s) is linear and oriented generally parallel with axis 36 of head 16. It is contemplated, however, that other movements (e.g., rotary movements, pivoting movements, etc.) may be possible. The linear movement may be facilitated, for example, via a pin 38 that is slidable through a bushing 40 mounted to or within arm 32. In one example, a distal tip of pin 38 may be blunted and have a roughened surface texture designed to inhibit slippage of (e.g., to pinch or pin down) the reinforcement's loose end. In another example, the distal tip of pin 38 may be rounded and/or smooth and designed to slip along an outer surface of the reinforcement's loose end, thereby providing temporary compaction along a restart segment during the anchoring process. In yet another embodiment, a roller 42 may be pivotally mounted at the distal tip of pin 38. Roller 42 may allow for TAP 24 to roll along the outer surface of the discharging material, thereby providing temporary compaction during the anchoring process.

Actuator 30 may be selectively operable to move plunger 28 between the stowed and engaged positions. In the disclosed example, actuator 30 is an electric solenoid mounted to arm 32 (e.g., via bushing 40) and configured to internally receive or otherwise engage a base end of pin 38. Windings 43 of actuator 30 may be selectively energized to generate a magnetic field that urges pin 38 toward the engaged position. A return spring 44 may return pin 38 to the stowed position upon de-energizing of windings 43. It should be noted that, although an electric solenoid has been shown and discussed as an example of actuator 30, other types of actuators (e.g., pneumatic cylinders, hydraulic lead screws, etc.) could be utilized, if desired.

In one embodiment, a radial distance between plunger 28 and nozzle 17 may be adjustable. This adjustability may be provided in any number of ways. For example, bushing 40 may be operatively disposed within a slot or track 46 of arm 32, and one or more mechanized devices (e.g., a motor-driven rack-and-pinion, a motor-driven lead screw, etc.) 48 may be used to shift bushing 40 laterally within track 46. In one example, cure enhancer 20 may be connected to a lower surface (i.e., a surface oriented toward structure 12) of arm 32. As will be described in more detail below, cure enhancer 20, actuator 30, and device 48 may be cooperatively regulated by controller 22 during an anchoring and/or cornering event.

INDUSTRIAL APPLICABILITY

The disclosed system and print head may be used to continuously manufacture composite structures having any desired cross-sectional size, shape, length, density, and/or strength. The composite structures may include any number of different reinforcements of the same or different types, diameters, shapes, configurations, and consists, each coated with a common matrix. In addition, the disclosed print head may allow for quick and simple restarting of printing processes, midway through fabrication of a structure. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of the reinforcements may be performed by passing the reinforcements down through matrix reservoir 26, and then threading the reinforcements through nozzle 17. Installation of the matrix may include filling reservoir 26 within head 16 and/or coupling of an extruder or external bath (not shown) to head 16. Head 16 may then be moved by support 14 under the regulation of controller 22 to cause matrix-coated reinforcements to be placed against or on a corresponding stationary anchor point 18. Cure enhancers 20 within head 16 may then be selectively activated to cause hardening of the matrix surrounding the reinforcements, thereby bonding the reinforcements to anchor point 18. Head 16 may remain stationary at anchor point 18 at this time, until adequate curing and bonding has been achieved.

The component information may then be used to control operation of system 10. For example, the reinforcements may be pulled and/or pushed from nozzle 17 (along with the matrix), while support 14 selectively moves head 16 in a desired manner during curing, such that an axis of the resulting structure 12 follows a desired trajectory (e.g., a free-space, unsupported, 3-D trajectory). Once structure 12 has grown to a desired size and/or length, structure 12 may be disconnected (e.g., severed) from head 16 in any desired manner.

Printing may then resume at another location within structure 12, with a different reinforcement, and/or with a different matrix. However, restarting of printing at a midpoint of structure 12 using the anchoring process described above may cause delays. For example, after discharge of a loose end of matrix-wetted reinforcement, head 16 may have to dwell at a stationary position long enough for the matrix to cure and sufficiently bond to the existing structure 12. That is, movement of head 16 away from the restart location could create enough tension to pull the loose end away from the existing structure, if too little dwell time and curing is allowed.

Fortunately, TAP 24 may provide the required dwell time and curing, without causing a delay in the movement of head 16. For example, controller 22 may cause head 16 to discharge the loose end of the matrix-wetted reinforcement from nozzle 17, selectively energize actuator 30 to press down on the loose end, and cause support 14 to immediately begin moving head 16 away from the restart location. During this movement, cure enhancer may be energized and TAP 24 may either move with head 16, sliding or rolling along the surface of the loose end, or remain stationary. For example, bushing 40 may slide radially outward away from nozzle 17 at this time (e.g., via activation of device 48), to thereby allow pin 38, actuator 30, and cure enhancer 20 to remain rooted at the new anchor location. Once sufficient anchoring has occurred, controller 22 may de-energize actuator 30, allowing spring 44 to return pin 38 to its stowed position. This should occur by the time that bushing 40 reaches the distal end of track 46 inside arm 32, so that head movement is not delayed.

It should be noted that, although TAP 24 may be intended primarily for temporary use at the start of a new path of material, TAP 24 may be additionally be used at sharp changes in head trajectory, to ensure that movement of head 16 along a new trajectory at a steep angle does not cause previously discharged material to pull away from an intended location. Specifically, once material at a corner location has been discharged form nozzle 17, controller 22 may energize actuator 30 to move pin 38 down onto the material at the corner location. Thereafter, controller 22 may cause support 14 to pivot head 16 around the corner location and continue along the new trajectory. Once bushing 40 (and plunger 28 and actuator 30) have has slide within slot 46 to the distal tip of arm 32, actuator 30 may be de-energized to raise pin 38 away from the material. The movement distance between the end positions of slot 46 within arm 32 may be sufficient to allow curing and anchoring of the loose fiber end prior to plunger 28 being lifted away from the loose fiber end.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A print head for an additive manufacturing system, comprising:
   a nozzle configured to discharge a material; and
   a traveling anchor point mounted at a trailing side of the nozzle and configured to selectively tack an end of the material as an anchor for discharge from the nozzle, the traveling anchor point including:
      an arm extending radially outward from the nozzle;
      a plunger slidingly disposed in the arm; and
      an actuator configured to selectively move the plunger from a stowed position to an engaged position against the material discharging from the nozzle.

2. The print head of claim 1, further including a bushing connecting the plunger to the arm.

3. The print head of claim 2, wherein:
   the bushing is moveable along a length of the arm during travel of the nozzle away from the plunger; and
   the plunger is configured to maintain engagement with the material during movement of the bushing.

4. The print head of claim 3, further including a mechanized device configured to move the bushing relative to the arm.

5. The print head of claim 4, wherein the mechanized device is one of a rack-and-pinion and a lead screw.

6. The print head of claim 1, wherein the actuator is an electric solenoid.

7. The print head of claim 1, further including a spring configured to return the plunger to the stowed position.

8. The print head of claim 1, wherein the plunger includes:
   a pin; and
   a roller operatively connected to an end of the pin.

9. The print head of claim 1, further including a cure enhancer mounted to a side of the arm, between the nozzle and the plunger.

10. The print head of claim 9, wherein the cure enhancer is a UV light.

11. The print head of claim 1, wherein the arm is connected to pivot around the nozzle.

12. The print head of claim 1, wherein:
   a base end of the arm is disposed within a channel that surrounds the nozzle; and
   the print head further includes a rotary actuator configured to move the base end of the arm.

13. A print head for an additive manufacturing system, comprising:
- a nozzle configured to discharge a material;
- a traveling anchor point mounted at a trailing side of the nozzle and configured to selectively tack an end of the material as an anchor, the traveling anchor point including:
  - an arm extending radially outward from the nozzle;
    - a bushing mounted to move along a length of the arm during tacking of the end of the material;
    - a plunger mounted to slide through the bushing; and
    - an actuator configured to selectively move the plunger from a stowed position to an engaged position against the material discharging from the nozzle; and
- a cure enhancer mounted to the arm between the nozzle and the plunger,
- wherein the plunger maintains engagement with the material during movement of the bushing along the length of the arm.

14. The print head of claim 13, further including a spring configured to return the plunger to the stowed position.

15. The print head of claim 13, wherein the plunger includes:
- a pin; and
- a roller operatively connected to an end of the pin.

16. The print head of claim 13, wherein the cure enhancer is a UV light.

17. The print head of claim 13, wherein:
- a base end of the arm is disposed within a channel that surrounds the nozzle; and
- the print head further includes a rotary actuator configured to move the base end of the arm.

18. An additive manufacturing system, comprising:
- a moveable support;
- a print head connected to the moveable support and configured to discharge a continuous reinforcement that is wetted with a liquid matrix, the print head including:
  - a matrix reservoir;
  - a nozzle fluidly connected to the matrix reservoir;
  - an arm extending radially outward from the nozzle;
    - a bushing mounted to move along a length of the arm;
    - a plunger mounted to slide through the bushing and configured to tack the continuous reinforcement for use as an anchor during pulling of the continuous reinforcement through the matrix reservoir and from the nozzle;
    - an actuator configured to selectively move the plunger from a stowed position to an engaged position against the continuous reinforcement discharging from the nozzle; and
  - a UV light mounted to the arm between the nozzle and the plunger; and
  - a controller configured to regulate operation of the moveable support, the actuator, and the UV light.

19. The additive manufacturing system of claim 18, wherein the print head further includes a spring configured to return the plunger to the stowed position.

20. The print head of claim 18, wherein the plunger includes:
- a pin; and
- a roller operatively connected to an end of the pin,
- wherein the roller maintains engagement with the material during movement of the nozzle away from the roller.

* * * * *